(No Model.)

H. ROTH.
Sand Guard for Car Axle Boxes.

No. 242,986. Patented June 14, 1881.

WITNESSES:
Chas. Nioa
C. Sedgwick

INVENTOR:
H. Roth
BY Munn & Co
ATTORNEYS.

UNITED STATES PATENT OFFICE.

HENRY ROTH, OF NEW YORK, N. Y., ASSIGNOR TO HIMSELF AND JOSEPH G. FOUNTAIN, OF NEW ORLEANS, LA.

SAND-GUARD FOR CAR-AXLE BOXES.

SPECIFICATION forming part of Letters Patent No. 242,986, dated June 14, 1881.

Application filed April 11, 1881. (No model.)

*To all whom it may concern:*

Be it known that I, HENRY ROTH, of the city, county, and State of New York, have invented a new and useful Improvement in Sand-Guards for Car-Axle Boxes, of which the following is a specification.

Figure 1:
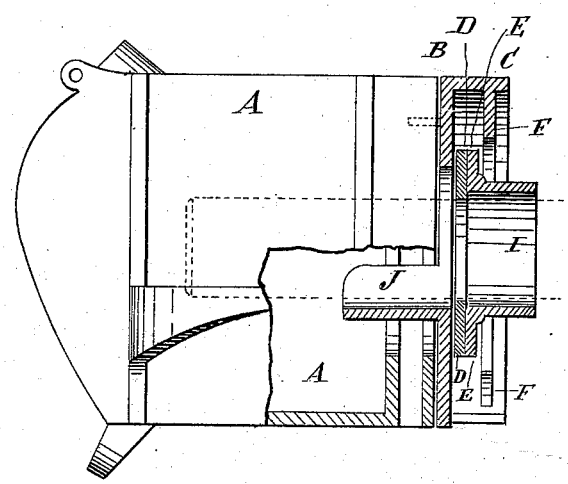
Figure 2:
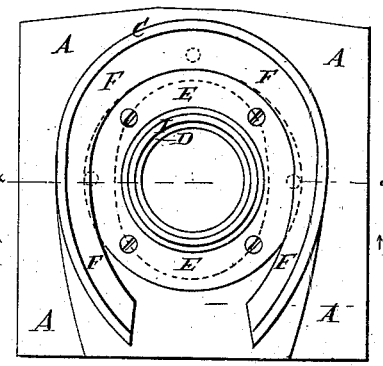
Figure 3:
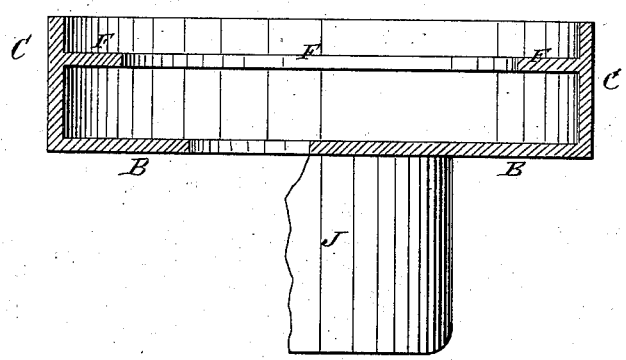

Figure 1 is a sectional elevation of my improvement, shown as applied to an axle-box. Fig. 2 is a front elevation of the same, and Fig. 3 is a section of the same detached.

Similar letters of reference indicate corresponding parts.

The object of this invention is to improve the construction of the sand-guards for which Letters Patent No. 235,298 were issued December 7, 1880, Henry Roth, inventor, in such a manner as to make them more effective in use.

A represents an ordinary axle-box.

B is a metal plate, upon which is cast or to which is attached a band or flange, C, made in circular or horseshoe form and open upon the lower side, as shown in Figs. 1 and 2. The plate B has an elongated hole formed through it for the passage of the journal. The plate B is secured to the axle-box A by bolts or screws or rivets, or is cast in one piece with said axle-box.

Upon the inner surface of the band C, at such a distance from the plate B as to receive the washer D E and give it the necessary play, is formed a flange, F, which is cast upon or permanently attached to the band C.

D is a leather washer, the aperture of which is made of such a size as to fit snugly upon the journal, so that the said journal may carry the washer with it in its revolution.

To the outer side of the leather washer D is secured, by screws or rivets, a metal washer, E, the aperture of which is made a little larger than the journal, so that it will not come in contact with the said journal.

Upon the metal washer E is formed a tube or pipe, I, through which the journal passes, and which fits upon the axle, and is made of such a length as to reach nearly to the wheel, space being left to give the said journal the necessary longitudinal play. With this construction the flange F prevents dust from passing in around the outer edge of the washer D E, and the pipe-washer I prevents dust from passing in around the inner edge of the said washer D E. With this construction the washer D E I can be readily slipped into and out of place when desired.

Upon the plate B, at the lower part of its aperture, is formed a semi-cylindrical or curved plate, J, which projects into the oil-chamber of the axle-box A, beneath the journal, to prevent oil from splashing out at the inner end of the said axle-box.

If desired, the splash-plate J may be made separate and with a flange upon its outer end to rest against the outer side of the axle-box. In this case a shoulder should be formed upon the plate B to keep the said splash-plate J in place.

Having thus described my invention, I claim as new and desire to secure by Letters Patent—

1. The combination, with the axle A, of the plate B, having flange C and an elongated hole, the flange C being itself provided with a flange, F, to receive the washer, as shown and described.

2. In a sand-guard for car-axle boxes, the combination, with the washer D E, of the pipe I, substantially as herein shown and described, whereby dust is prevented from passing in around the inner edge of the said washer, as set forth.

HENRY ROTH.

Witnesses:
JAMES T. GRAHAM,
C. SEDGWICK.